(12) United States Patent
Katayama et al.

(10) Patent No.: US 7,777,356 B2
(45) Date of Patent: Aug. 17, 2010

(54) MODIFIED POLYALUMINOSILOXANE

(75) Inventors: Hiroyuki Katayama, Ibaraki (JP);
Kouji Akazawa, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 12/364,731

(22) Filed: Feb. 3, 2009

(65) Prior Publication Data

US 2009/0227757 A1 Sep. 10, 2009

(30) Foreign Application Priority Data

Mar. 6, 2008 (JP) ............................. 2008-056695
Nov. 17, 2008 (JP) ............................. 2008-293557

(51) Int. Cl.
*H01L 23/29* (2006.01)

(52) U.S. Cl. ................. 257/791; 525/389; 525/475; 525/476; 525/477; 528/30; 556/10; 556/173; 556/178; 556/402; 556/450

(58) Field of Classification Search ................. 525/389, 525/475, 477, 476; 556/10, 172, 173, 178, 556/402, 450, 458; 257/791; 528/30
See application file for complete search history.

(56) References Cited

U.S. PATENT DOCUMENTS

| | | | | |
|---|---|---|---|---|
| 2,460,799 | A * | 2/1949 | Barry | ........................... 528/16 |
| 4,073,967 | A | 2/1978 | Sandvig | |
| 5,614,654 | A | 3/1997 | Miyake et al. | |
| 2009/0061549 | A1 * | 3/2009 | Harada et al. | ................. 438/26 |
| 2009/0227757 | A1 | 9/2009 | Katayama et al. | |

FOREIGN PATENT DOCUMENTS

| EP | 0 263 428 A2 | 4/1988 |
|---|---|---|
| EP | 0 263 428 A3 | 4/1988 |
| EP | 0 358 011 A2 | 3/1990 |
| EP | 0 358 011 A3 | 3/1990 |
| JP | 9-48787 | 2/1997 |
| JP | 2003-165841 | 6/2003 |

OTHER PUBLICATIONS

Machine translation of JP 2003-165841 [online], accessed via the Internet [retrieved on Jul. 29, 2009], URL: <http://www19.ipdl.inpit.go.jp/PA1/cgi-bin/PA1INDEX>.*
Shin-Etsu Silicone Silane Coupling Agents, 2002, p. 1-16 [online], accessed via the Internet [retrieved on Jul. 29, 2009], URL: <http://www.silicone.jp/e/catalog/pdf/silanecoupling_e.pdf>.*
U.S. Appl. No. 12/549,956, filed Aug. 28, 2009, Katayama.
U.S. Appl. No. 12/553,227, filed Sep. 3, 2009, Katayama.

* cited by examiner

*Primary Examiner*—David Wu
*Assistant Examiner*—Robert Jones, Jr.
(74) *Attorney, Agent, or Firm*—Oblon, Spivak, McClelland, Maier & Neustadt, L.L.P.

(57) ABSTRACT

A modified polyaluminosiloxane obtained by treating a polyaluminosiloxane with a silane coupling agent represented by the formula (I):

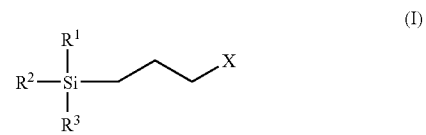

wherein each of $R^1$, $R^2$ and $R^3$ is independently an alkyl group or an alkoxy group; X is a methacryloxy group, a glycidoxy group, an amino group, a vinyl group or a mercapto group, with proviso that at least two of $R^1$, $R^2$ and $R^3$ are alkoxy groups. The photosemiconductor element encapsulating material of the present invention is suitably used for, for example, photosemiconductor devices mounted with blue or white LED elements (backlights for liquid crystal displays, traffic lights, outdoor big displays, advertisement sign boards, and the like).

10 Claims, No Drawings

MODIFIED POLYALUMINOSILOXANE

FIELD OF THE INVENTION

The present invention relates to, for example, a modified polyaluminosiloxane, a photosemiconductor element encapsulating material containing the modified polyaluminosiloxane, and a photosemiconductor device containing photosemiconductor elements encapsulated with the encapsulating material.

BACKGROUND OF THE INVENTION

Encapsulating resins having excellent transparency and heat resistance are demanded for LED devices. Epoxy resins may be subject to discoloration upon long duration of use at high temperatures, or the brightness of the light-emitting diodes may be lowered in some cases.

In addition, polyaluminosiloxanes are polymers obtained by reacting a polysiloxane and an aluminum compound and have excellent heat resistance; therefore, the polyaluminosiloxanes are used in various applications, including, for example, coating agents, sealing agents, adhesives, and the like.

For example, Japanese Patent Laid-Open Nos. Hei 9-48787 and 2003-165841 describe various aluminosiloxanes and polyaluminosiloxanes. However, there are some disadvantages that the adhesion to LED devices and molding processability still have rooms for improvement.

SUMMARY OF THE INVENTION

The present invention relates to:

[1] a modified polyaluminosiloxane obtained by treating a polyaluminosiloxane with a silane coupling agent represented by the formula (I):

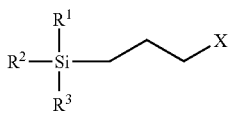

(I)

wherein each of $R^1$, $R^2$ and $R^3$ is independently an alkyl group or an alkoxy group; X is a methacryloxy group, a glycidoxy group, an amino group, a vinyl group or a mercapto group, with proviso that at least two of $R^1$, $R^2$ and $R^3$ are alkoxy groups;

[2] a photosemiconductor element encapsulating material containing the modified polyaluminosiloxane as defined in the above [1]; and

[3] a photosemiconductor device containing a photosemiconductor element encapsulated with the photosemiconductor element encapsulating material as defined in the above [2].

DETAILED DESCRIPTION OF THE INVENTION

The present invention relates to a modified polyaluminosiloxane having not only excellent heat resistance but also excellent transparency, adhesion and sheet moldability. In addition, the present invention relates to a photosemiconductor element encapsulating material containing the modified polyaluminosiloxane, and a photosemiconductor device containing a photosemiconductor element encapsulated with the encapsulating material.

Since the modified polyaluminosiloxane of the present invention leads to not only excellent heat resistance, but also excellent transparency, adhesion and sheet moldability, the modified polyaluminosiloxane can be suitably used as an encapsulating material for photosemiconductor elements. Further, in a case where the photosemiconductor elements are encapsulated, the brightness maintaining percentage is also excellent.

These and other advantages of the present invention will be apparent from the following description.

The modified polyaluminosiloxane of the present invention is obtained by treating a polyaluminosiloxane with a specified silane coupling agent. The modified polyaluminosiloxane is capable of controlling the reactivity stepwise, depending upon the function groups of silane coupling agents introduced. According to a first-step crosslinking reaction (hereinafter also referred to as a primary crosslinking), the photosemiconductor element encapsulating material can be efficiently produced into a sheet-like form using the modified polyaluminosiloxane, and according to a second-step crosslinking reaction (hereinafter also referred to a secondary crosslinking), the sheet can be cured. As described above, the modified polyaluminosiloxane of the present invention has an advantage that the production of a sheet according to the primary crosslinking, and curing after the encapsulation according to the secondary crosslinking can be separately and stepwise performed; therefore, the modified polyaluminosiloxane leads to not only excellent heat resistance, but also excellent transparency, adhesion, sheet moldability, and brightness maintaining percentage. Here, in the present invention, the term "sheet moldability" refers to efficient sheet molding.

In the present invention, the silane coupling agent is represented by the formula (I):

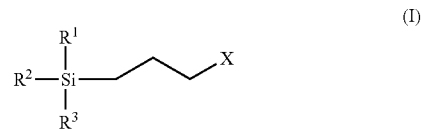

(I)

wherein each of $R^1$, $R^2$ and $R^3$ is independently an alkyl group or an alkoxy group; X is a methacryloxy group, a glycidoxy group, an amino group, a vinyl group or a mercapto group, with proviso that at least two of $R^1$, $R^2$ and $R^3$ are alkoxy groups, and it is desired that the primary crosslinking is carried out via the $R^1$, $R^2$ or $R^3$ group, and the secondary crosslinking is carried out via the X group.

In the formula (I), each of $R^1$, $R^2$ and $R^3$ is independently an alkyl group or an alkoxy group, with proviso that at least two of $R^1$, $R^2$ and $R^3$ are alkoxy groups. The number of carbon atoms of the alkyl group and the alkoxy group is preferably from 1 to 12, more preferably from 1 to 6, and even more preferably from 1 to 3. Specifically, the alkyl group is exemplified by a methyl group, an ethyl group, a propyl group, an isopropyl group, and the like, and the alkoxy group is exemplified by a methoxy group, an ethoxy group, and the like. Among them, it is preferable that each of $R^1$, $R^2$ and $R^3$ is independently a methyl group or a methoxy group, and at least two of $R^1$, $R^2$ and $R^3$ are methoxy groups, and it is more preferable that all of $R^1$, $R^2$ and $R^3$ are methoxy groups.

In the formula (I), X is a methacryloxy group, a glycidoxy group, an amino group, a vinyl group or a mercapto group.

Among them, it is preferable that X is a methacryloxy group or a glycidoxy group, from the viewpoint of reactivity upon the secondary crosslinking.

In addition, in the present invention, it is preferable that the silane coupling agent is a compound represented by the formula (II):

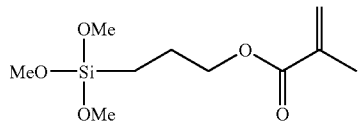

(II)

or the formula (III):

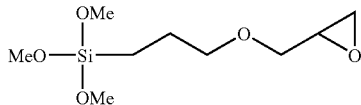

(III)

and a part of the methoxy groups of the formula (II) may be a methyl group. These compounds can be used alone or in a combination of plural kinds.

The above silane coupling agent can be prepared in accordance with a known method, or a commercially available product may be used. For example, as the compound represented by the formula (II), a methacryl group-containing silane coupling agent (KBM-503, commercially available from Shin-Etsu Chemical Co., Ltd.) is preferably used, and as the compound represented by the formula (III), an epoxy group-containing silane coupling agent (KBM-403, commercially available from Shin-Etsu Chemical Co., Ltd.) is preferably used.

The silane coupling agent used in the synthesis reaction for the modified polyaluminosiloxane is added in an amount of preferably from 1 to 50% by weight, more preferably from 1 to 30% by weight, even more preferably from 1 to 15% by weight, and even more preferably from 2 to 11% by weight, of the reaction mixture, from the viewpoint of heat resistance, transparency, adhesion, and sheet moldability.

In the present invention, it is preferable that the polyaluminosiloxane contains a structural unit represented by the formula (IV):

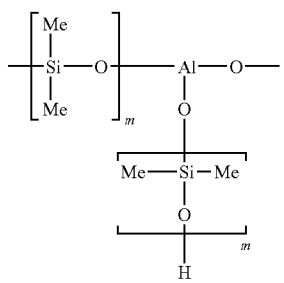

(IV)

wherein m is an integer of from 5 to 500; and/or the formula (V):

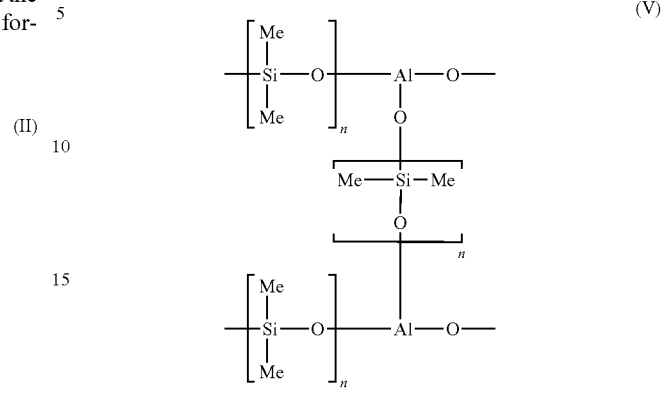

(V)

wherein n is an integer of from 5 to 500, and a terminal part being —OH.

m in the formula (IV), or n in the formula (V), is preferably 5 to 500, more preferably from 10 to 500, and even more preferably from 40 to 155, from the viewpoint of heat resistance and sheet moldability.

In addition, the polyaluminosiloxane may be a polyaluminosiloxane comprising the structural unit represented by the formula (IV) or (V), alone or in combination.

It is desired that the polyaluminosiloxane used in the present invention is synthesized by reacting a silicon-containing compound and an aluminum compound that are given below.

The silicon-containing compound includes silanol end-capped (dual-end type) silicone oils, such as silanol end-capped (dual-end type) poly(dimethyl siloxanes), silanol end-capped (dual-end type) poly(diphenyl siloxanes), and silanol end-capped (dual-end type) poly(methylphenyl siloxanes), from the viewpoint of reactivity, and these silicon-containing compounds can be used alone or in combination of two or more kinds. Among them, it is preferable to use silanol end-capped (dual-end type) poly(dimethyl siloxanes).

The aluminum compound includes aluminum methoxide, aluminum ethoxide, aluminum isopropoxide, aluminum butoxide, and the like, and these aluminum compounds can be used alone or in combination of two or more kinds. Among them, it is preferable to use aluminum isopropoxide.

It is preferable that the silicon-containing compound and the aluminum compound used in the synthesis reaction of the polyaluminosiloxane are in a weight ratio, i.e. silicon-containing compound/aluminum compound, of from 99/1 to 30/70.

The reaction of the silicon-containing compound and the aluminum compound can be carried out, for example, at a temperature of from 0° to 100° C. for 1 to 48 hours, while stirring in the absence of a solvent. Thereafter, insoluble substances are removed by centrifugation, and the solution is concentrated under a reduced pressure preferably at a temperature of from 20° to 100° C. for preferably 0.5 to 6 hours, whereby a polyaluminosiloxane can be obtained.

The polyaluminosiloxane used in the reaction with the silane coupling agent is in an amount of preferably from 50 to 99% by weight, more preferably from 70 to 99% by weight, even more preferably from 85 to 99% by weight, and even more preferably from 89 to 98% by weight, of the reaction mixture, from the viewpoint of heat resistance, transparency, adhesion, and sheet moldability.

The treatment of the above polyaluminosiloxane with the above silane coupling agent is carried out under a reduced pressure at a temperature of preferably from 20° to 150° C., and more preferably from 50° to 100° C., for preferably from 0.1 to 10 hours, and more preferably from 1 to 3 hours while stirring.

Further, a photopolymerization initiator may be optionally added to the reaction mixture in order to progress the secondary crosslinking. The photopolymerization initiator includes radical photopolymerization initiators and the like, and includes, for example, alkylphenone-based photopolymerization initiators, acylphosphine oxide-based photopolymerization initiators, titanocene photopolymerization initiators, and the like. Among them, it is preferable to use 2-hydroxy-2-methyl-1-phenyl-propan-1-one (DAROCUR 1173, commercially available from Ciba Specialty Chemicals), which is an alkylphenone-based photopolymerization initiator.

The photopolymerization initiator used in the reaction is in an amount of preferably from 0.001 to 2% by weight, more preferably from 0.01 to 1% by weight, and even more preferably from 0.1 to 1% by weight, of the reaction mixture, from the viewpoint of heat resistance and transparency.

The treatment of the polyaluminosiloxane with the silane coupling agent is carried out in the absence or presence of an organic solvent. When the treatment is carried out in the presence of an organic solvent, the preferred organic solvents include esters such as butyl acetate and ethyl acetate; ether solvents such as diethyl ether, dibutyl ether, and dioxane; ketone solvents such as acetone, methyl ethyl ketone, methyl isobutyl ketone, and cyclohexanone; and other solvents such as hexane, octane, toluene, and xylene.

After the termination of the treatment of the polyaluminosiloxane with the silane coupling agent, the reaction mixture is heated under a reduced pressure, so that by-products and organic solvents can be removed, whereby the modified polyaluminosiloxane of the present invention can be obtained.

It is preferable that the modified polyaluminosiloxane has a viscosity at 25° C. of preferably from 100 to 20000 mPa·s, and more preferably from 1000 to 10000 mPa·s, from the viewpoint of sheet moldability.

The present invention provides a photosemiconductor element encapsulating material containing the above modified polyaluminosiloxane. The photosemiconductor element encapsulating material containing the modified polyaluminosiloxane is preferably formed into a sheet, from the viewpoint of molding processability, operability, and production efficiency. The reaction mixture is thoroughly stirred to make it homogeneous, and thereafter coated on a Teflon sheet using an applicator and subjected to a primary-crosslinking by heating to a temperature of preferably from 80° to 250° C., and more preferably from 100° to 200° C., for preferably 1 to 120 minutes, and more preferably from 2 to 60 minutes, whereby a sheet can be produced.

The photosemiconductor element encapsulating material of the present invention is suitably used for, for example, photosemiconductor devices mounted with blue or white LED elements (backlights for liquid crystal displays, traffic lights, outdoor big displays, advertisement sign boards, and the like). The present invention also provides a photosemiconductor device containing a photosemiconductor element encapsulated with the above photosemiconductor element encapsulating material. Since the photosemiconductor element is encapsulated with the encapsulating material, the photosemiconductor device can be provided with excellent brightness maintaining percentage.

The photosemiconductor device of the present invention can be produced by encapsulating, for example, LED elements with the above-mentioned photosemiconductor element encapsulating material. Specifically, a photosemiconductor device can be produced by directly applying a photosemiconductor element encapsulating material (sheet) to a substrate mounted with LED elements, (1) heating the encapsulating material under a reduced pressure preferably at a temperature of from 20° to 200° C. for preferably 1 to 60 minutes, and subjecting to encapsulation processing with applying a pressure of preferably from 0.01 to 1.0 MPa, and further (2) subjecting to a secondary crosslinking (post-curing) at a temperature of preferably 100° to 200° C. for preferably 0.5 to 48 hours, thereby encapsulating the photosemiconductor elements. Here, in a case where a photopolymerization initiator is used, for example, a PET film is laminated on a photosemiconductor device encapsulated with a sheet, the sheet is irradiated with UV-A rays of preferably from 100 to 10000 mJ/cm$^3$, whereby a sheet containing a modified polyaluminosiloxane can be separately cured. It is preferable that this step is carried out prior to (2).

EXAMPLES

The following examples further describe and demonstrate embodiments of the present invention. The examples are given solely for the purposes of illustration and are not to be construed as limitations of the present invention.

(Synthesis of Polyaluminosiloxane A)

The amount 8.22 g (40.2 mmol) of aluminum isopropoxide was added to 600 g (0.200 mol) of silanol end-capped (dual-end type) silicone oil (commercially available from Shin-Etsu Chemical Co., Ltd., KF-9701, average molecular weight: 3000), and the mixture was stirred at room temperature for 24 hours. Insoluble substances were removed from the resulting mixture by centrifugation, and the solution was concentrated under a reduced pressure at 50° C. for 2 hours. As a result, a polyaluminosiloxane A was obtained as a colorless transparent oil [a mixture of the compound represented by the formula (IV) (m=40) and the compound represented by the formula (V) (n=40)].

(Synthesis of Polyaluminosiloxane B)

The amount 2.75 g (13.5 mmol) of aluminum isopropoxide was added to 200 g (0.200 mol) of silanol end-capped (dual-end type) silicone oil (commercially available from Shin-Etsu Chemical Co., Ltd., X-21-5841, average molecular weight: 11500), and the mixture was stirred at room temperature for 24 hours. Insoluble substances were removed from the resulting mixture by centrifugation, and the solution was concentrated under a reduced pressure at 50° C. for 2 hours. As a result, a polyaluminosiloxane B was obtained as a colorless transparent oil [a mixture of the compound represented by the formula (IV) (m=155) and the compound represented by the formula (V) (n=155)].

Example 1

Synthesis of Methacryl Group-Containing Modified Polyaluminosiloxane C

The amount 3.00 g (12.1 mmol) of a methacryl group-containing silane coupling agent (commercially available from Shin-Etsu Chemical Co., Ltd., KBM-503, all of $R^1$, $R^2$ and $R^3$ in the formula (I) being methoxy groups, and X being a methacryloxy group) was added to 30.0 g of the polyaluminosiloxane A, and the mixture was stirred under a reduced pressure at 80° C. for 10 minutes. To the resulting mixture was added 0.15 g of a photopolymerization initiator (name of ingredient: 2-hydroxy-2-methyl-1-phenyl-propan-1-one, commercially available from Ciba Specialty Chemicals, trade name: DAROCUR 1173), and the mixture was thoroughly stirred to give a homogeneous mixture, and coated on Teflon (registered trademark) sheet using an applicator. This mixture was heated at 100° C. for 30 minutes, and as a result, a colorless transparent sheet made of a photosemiconductor element encapsulating material containing a methacryl group-containing modified polyaluminosiloxane C.

Example 2

Synthesis of Methacryl Group-Containing Modified Polyaluminosiloxane D

The same procedures as in Example 1 were carried out, except that the methacryl group-containing silane coupling agent (commercially available from Shin-Etsu Chemical Co., Ltd., KBM-503) was used in an amount of 0.600 g (2.42 mmol), and a colorless transparent sheet made of a photosemiconductor element encapsulating material containing a methacryl group-containing modified polyaluminosiloxane D was obtained.

Example 3

Synthesis of Methacryl Group-Containing Modified Polyaluminosiloxane E

The same procedures as in Example 1 were carried out, except that the polyaluminosiloxane B was used in place of the polyaluminosiloxane A, and a colorless transparent sheet made of a photosemiconductor element encapsulating material containing a methacryl group-containing modified polyaluminosiloxane E was obtained.

Example 4

Synthesis of Methacryl Group-Containing Modified Polyaluminosiloxane F

The amount 3.58 g (14.4 mmol) of a methacryl group-containing silane coupling agent (commercially available from Shin-Etsu Chemical Co., Ltd., KBM-503) and 1.27 g (5.47 mmol) of a methacryl group-containing silane coupling agent (commercially available from Shin-Etsu Chemical Co., Ltd., KBM-502, two of $R^1$, $R^2$ and $R^3$ in the formula (I) being methoxy groups and the remaining one being a methyl group ($R^1$ is a methyl group, and $R^2$ and $R^3$ are methoxy groups), and X being a methacryloxy group) was added to 30.0 g of the polyaluminosiloxane A, and the mixture was stirred under a reduced pressure at 80° C. for 2 hours. To the resulting mixture was added 0.15 g of a photopolymerization initiator (name of ingredient: 2-hydroxy-2-methyl-1-phenyl-propan-1-one, commercially available from Ciba Specialty Chemicals, trade name: DAROCUR 1173), and the mixture was thoroughly stirred to give a homogeneous mixture, and coated on Teflon (registered trademark) sheet using an applicator. This mixture was heated at 100° C. for 30 minutes, and as a result, a colorless transparent sheet made of a photosemiconductor element encapsulating material containing a methacryl group-containing modified polyaluminosiloxane F was obtained.

Example 5

Synthesis of Epoxy Group-Containing Modified Polyaluminosiloxane G

The amount 1.00 g (4.23 mmol) of an epoxy group-containing silane coupling agent (commercially available from Shin-Etsu Chemical Co., Ltd., KBM-403, all of $R^1$, $R^2$ and $R^3$ in the formula (I) being methoxy groups, and X being an epoxy group) was added to 10.0 g of the polyaluminosiloxane A, and the mixture was stirred under a reduced pressure at 80° C. for 7 minutes. The mixture was coated on Teflon (registered trademark) sheet using an applicator, and heated at 100° C. for 5 minutes, and as a result, a colorless transparent sheet made of a photosemiconductor element encapsulating material containing an epoxy group-containing modified polyaluminosiloxane G was obtained.

Production of Photosemiconductor Devices

A sheet made of a photosemiconductor element encapsulating material containing each of the methacryl group-containing modified polyaluminosiloxanes C to F obtained in Examples 1 to 4 was covered over a substrate mounted with blue LEDs (photosemiconductor device), and the sheet was heated at 160° C. under a reduced pressure, and subjected to encapsulation processing at a pressure of 0.2 MPa. To the resulting photosemiconductor device was laminated a PET film, and thereafter UV-A rays of 5000 mJ/cm$^3$ were irradiated to cure the sheet. Further, the sheet was subjected to a secondary crosslinking (post-curing) at 150° C. for 1 hour, to produce each of the photosemiconductor devices.

A sheet made of a photosemiconductor element encapsulating material containing the epoxy group-containing modified polyaluminosiloxane G obtained in Example 5 was covered over a substrate mounted with blue LEDs (photosemiconductor device), and the sheet was heated at 160° C. under a reduced pressure, and subjected to encapsulation processing at a pressure of 0.2 MPa. The resulting photosemiconductor device was subjected to a secondary crosslinking (post-curing) at 150° C. for 1 hour, to produce a photosemiconductor device.

Comparative Example 1

The polyaluminosiloxane A was applied to a substrate mounted with blue LEDs (photosemiconductor device) by spin-coating (1500 r/min for 20 seconds). Thereafter, the coating was dried at 150° C. for 3 hours and then at 200° C. for 12 hours, to produce a photosemiconductor device.

Comparative Example 2

Forty-five parts by weight of an epoxy resin having a bisphenol A (BFA) backbone having an epoxy equivalence of 7500 (commercially available from Japan Epoxy Resins Co., Ltd., EPI 1256), 33 parts by weight of an epoxy resin having an alicyclic backbone having an epoxy equivalence of 260 (commercially available from DAICEL CHEMICAL INDUSTRIES, LTD., EHPE3150), 22 parts by weight of 4-methylhexahydrophthalic anhydride (commercially available from New Japan Chemical Co., Ltd., MH-700), and 1.2 parts by weight of 2-methylimidazole (commercially available from SHIKOKU CHEMICALS, CORPORATION, 2MZ) were dissolved in a MEK solvent on 50% base, to prepare a coating solution. This coating solution was applied to a twin-screw stretching polyester film (commercially available from Mitsubishi Chemical Polyester Film Co., Ltd, thickness: 50 μm) so as to have a thickness of 100 μm, and the coating was dried at 130° C. for 2 minutes, to give a piece of a base sheet. Further, three pieces of this sheet were thermally laminated at 100° C., to produce a sheet made of an epoxy resin H having a thickness of 300 μm.

A blue LED-mounted substrate was heated to 150° C., the above epoxy resin sheet was covered immediately over the chip, and the sheet was subjected to encapsulation processing with a pressure of 0.5 MPa, to produce a photosemiconductor device.

Each sheet or device obtained above was evaluated in accordance with the following methods. The results are shown in Table 1.

applied at this time was referred to as adhesion. A relative value when the adhesion of the polyaluminosiloxane A is defined as 1 is shown.

4) Brightness Maintaining Percentage

Electric current of 300 mA was allowed to flow through a photosemiconductor device of each of Examples and Comparative Examples, and the brightness immediately after the beginning of the test was determined with MCPD (Multi-Channel Photo-Detector System MCPD-3000, commercially available from Otsuka Electronics Co., Ltd.). Thereafter, the photosemiconductor device was allowed to stand in a condition where the electric current was allowed to flow, and the brightness after 300 hours passed was determined in the same manner. The brightness maintaining percentage was calculated by the following formula:

TABLE 1

Brightness Maintaining Percentage (%) = $\dfrac{\text{Brightness After Passage of 300 Hours of Continuous Lighting-up at 300 mA}}{\text{Brightness Immediately After the Beginning of the Test}} \times 100$

| | Resin | Transparency (%) | Heat Resistance | Adhesion | Brightness Maintaining Percentage (%) |
|---|---|---|---|---|---|
| Ex. 1 | Methacryl Group-Containing Modified Polyaluminosiloxane C | 100 | ○ | 4.6 | 100 |
| Ex. 2 | Methacryl Group-Containing Modified Polyaluminosiloxane D | 100 | ○ | 4.8 | 100 |
| Ex. 3 | Methacryl Group-Containing Modified Polyaluminosiloxane E | 100 | ○ | 4.1 | 100 |
| Ex. 4 | Methacryl Group-Containing Modified Polyaluminosiloxane F | 100 | ○ | 5.4 | 100 |
| Ex. 5 | Epoxy Group-Containing Modified Polyaluminosiloxane G | 100 | ○ | 6.9 | 100 |
| Comp. Ex. 1 | Polyaluminosiloxane A | 100 | ○ | 1 | 100 |
| Comp. Ex. 2 | Epoxy Resin H | 95 | X | 62 | 40 |

1) Transparency

The light transmittance (calculated as a sheet thickness of 100 μm) at a wavelength of 450 nm was determined for a sheet of each of Examples and Comparative Examples with a spectrophotometer (U-4100, commercially available from Hitachi High-Technologies Corporation). This was evaluated as transparency (%).

2) Heat Resistance

A sheet of each of Examples and Comparative Examples was allowed to stand in a hot air dryer at 150° C. for 100 hours. The transparency of the resin after 100 hours passed was visually observed. One that does not undergo any discoloration from the condition before storage is evaluated as ○, and one that undergoes discoloration from the condition before storage is evaluated as ×.

3) Adhesion

From a photosemiconductor device produced by using a sheet of each of Examples and Comparative Examples, each sheet was removed using a push-pull gauge, and a load It can be seen from the above that Examples 1 to 5 have not only excellent heat resistance but also excellent transparency and adhesion, as compared with Comparative Examples 1 and 2. In addition, since a silane coupling agent is used, a sheet can be produced efficiently in an even shorter time period, and sheet moldability is also excellent. Further, a photosemiconductor device encapsulated with the sheet has excellent brightness maintaining percentage. The modified polyaluminosiloxanes of Examples 1 to 5 show improvement in adhesion, when compared with the polyaluminosiloxane of Comparative Example 1, and the modified polyaluminosiloxanes show improvements in heat resistance, transparency and brightness maintaining percentage, as compared with the epoxy resin of Comparative Example 2.

The photosemiconductor element encapsulating material of the present invention is suitably used for, for example, photosemiconductor devices mounted with blue or white LED elements (backlights for liquid crystal displays, traffic lights, outdoor big displays, advertisement sign boards, and the like).

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A photosemiconductor element encapsulating material comprising a modified polyaluminosiloxane, wherein
the modified polyaluminosiloxane is obtained by treating a polyaluminosiloxane with a silane coupling agent represented by formula (I):

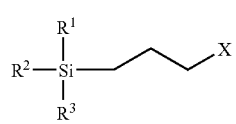

wherein each of $R^1$, $R^2$ and $R^3$ is independently an alkyl group or an alkoxy group; X is a methacryloxy group, a glycidoxy group, an amino group, a vinyl group or a mercapto group, with proviso that at least two of $R^1$, $R^2$ and $R^3$ are alkoxy groups,
wherein the polyaluminosiloxane comprises a structural unit represented by at least one of formula (IV):

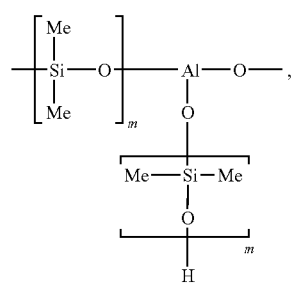

wherein m is an integer of from 40 to 155;
and formula (V):

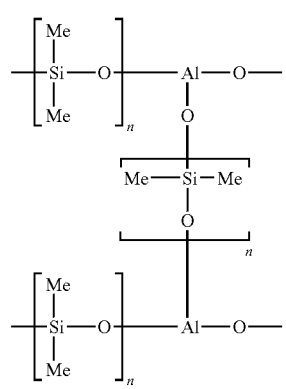

wherein n is an integer of from 40 to 155,
and a terminal part being —OH.

2. A photosemiconductor device comprising a photosemiconductor element encapsulated with the photosemiconductor element encapsulating material according to claim 1.

3. The photosemiconductor element encapsulating material according to claim 1, wherein the polyaluminosiloxane comprises a structural unit represented by formula (V):

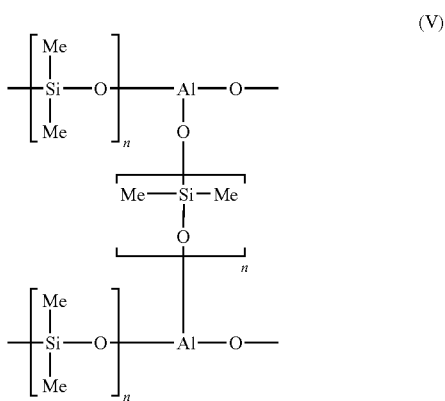

wherein n is an integer of from 40 to 155, and a terminal part is —OH.

4. A sheet comprising the photosemiconductor element encapsulating material according to claim 1.

5. A photosemiconductor device comprising the sheet according to claim 4.

6. The photosemiconductor element encapsulating material according to claim 1, wherein the modified polyaluminosiloxane is obtained by a process comprising reacting a silicon-containing compound and an aluminum compound, wherein the silicon-containing compound comprises a silanol end-capped (dual-end type) silicon oil.

7. The photosemiconductor element encapsulating material according to claim 6, wherein the silanol end-capped (dual-end type) silicon oil comprises one of silanol end-capped (dual-end type) poly(dimethyl siloxanes), silanol end-capped (dual-end type) poly(diphenyl siloxanes), silanol end-capped (dual-end type) poly(methylphenyl siloxanes) and the mixture thereof.

8. The photosemiconductor element encapsulating material according to claim 6, wherein the aluminum compound comprises one of an aluminum methoxide, an aluminum ethoxide, an aluminum isotpropoxide, an aluminum butoxide and the mixture thereof.

9. The photosemiconductor element encapsulating material according to claim 6, wherein the process comprises adding a photopolymerization initiator to a mixture of the silicon-containing compound and the aluminum compound.

10. The photosemiconductor element encapsulating material according to claim 6, wherein the photopolymerization initiator comprises one of an alkylphenone-based photopolymerization initiator, an acylphosphine oxide-based photopolymerization initiator, and a titanocene photopolymerization initiator.

* * * * *